United States Patent
Severns

(10) Patent No.: US 6,227,317 B1
(45) Date of Patent: May 8, 2001

(54) GARDEN AUGER HAVING WINGS AND CUTTERS

(76) Inventor: Robert P. Severns, 5430 W. Catrina Rd., Dos Palos, CA (US) 93620

( * ) Notice: Subject to any disclaimer, the term of this patent is extended or adjusted under 35 U.S.C. 154(b) by 0 days.

(21) Appl. No.: 08/890,728

(22) Filed: Jul. 9, 1997

(51) Int. Cl.[7] .............................. A01B 35/28; E21B 10/42
(52) U.S. Cl. ...................... 175/421; 175/397; 30/DIG. 7; 172/111; 111/113
(58) Field of Search ........................... 111/110, 112, 113, 111/116; 172/35, 41, 51, 110, 111; 175/397, 421, 392, 408; 30/299, 302, 303, 304, 500, DIG. 7

(56) References Cited

U.S. PATENT DOCUMENTS

| | | | |
|---|---|---|---|
| 40,176 | * 10/1863 | Marshall | 175/421 |
| 134,805 | * 1/1873 | Hipkins, Jr. | 175/421 |
| 181,036 | * 8/1876 | Caler et al. | 175/421 |
| 3,129,771 | * 4/1964 | Lidstone | 172/111 |
| 4,723,802 | * 2/1988 | Fambrough | 172/41 |
| 5,687,807 | * 11/1997 | Woods et al. | 175/397 |

FOREIGN PATENT DOCUMENTS

640013 * 5/1962 (IT) .

* cited by examiner

Primary Examiner—Eileen D. Lillis
Assistant Examiner—Sunil Singh
(74) Attorney, Agent, or Firm—Lyon & Lyon LLP

(57) ABSTRACT

A garden auger having an auger blade with a substantially rectangular body section for use with a drill motor. The preferred auger body including toed-in wings for rapidly clearing earth from the created hole and cutters formed at one end of the auger blade.

12 Claims, 3 Drawing Sheets

GARDEN AUGER HAVING WINGS AND CUTTERS

BACKGROUND OF THE INVENTION

1. Field of the Invention

The field of the invention pertains to augers for use in planting and methods for using them.

2. Description of the Technology

Augers for boring large holes in the ground have existed for quite some time. Traditionally they constructed in accordance with a standard helical screw type construction having a central shaft and an inclined plane wrapped around the central shaft in a spiral staircase fashion. While these "spiral staircase" types of augers have proven successful for boring holes for telephone poles, post holes and foundation piers, they are not satisfactory for boring holes for bulbs, seedlings and perennial starts.

Typically the drive motors for the "spiral staircase" types of augers are gas powered with slow rotation and high torque and connected with clutches to the auger. For large telephone pole type augers the drive motors are rendered stationary and for the two-person augers used for post holes, the two operators provide the stability. Because of the strong driving force and stability, the rotation of the auger can successfully elevate the new dirt that is captured by the auger blades up and out of the hole. However, because of the helical screw type blade, the tendency of these types of augers is to merely screw themselves into the ground, just as a screw is driven into wood or metal without creating a hole. The holes are actually created by preventing the auger from being pulled into the ground by restraining the vertical speed at which the auger penetrates the ground. To accomplish this, the user must have sufficient countering force to prevent penetrating the ground at the same rate as the rotation and pitch of the screw would normally require. For large telephone pole augers, this is no problem since they are mounted to large stationary drives which also restrict the penetration rate. When using a one or two person post hole digger, the users must provide the countervailing force, which as anyone who has used those devices knows, is the majority of the work that is required.

With known spiral staircase augers for use with electric drills for planting bulbs, the user will usually have to slow the speed of the auger down dramatically, which can result in difficulty in penetrating hard soil, or exert a great deal of energy preventing the auger from screwing itself into the ground. Thus, the known spiral staircase augers are not optimal for long periods of use and are not efficient either in speed or energy usage.

Further, since the earth is elevated along the helical blade, effort is required to lift the fully loaded spiral staircase auger out of the hole or the auger and drive motor must be held stationary for a period of time to allow the helical blade to clear itself of loosened earth. In sandy soil, typically the auger will not successfully clear the hole because the sandy soil will slide back down the helical blade and refill the hole. Finally, the traditional spiral staircase auger has a limitation on the size of the rocks that can be elevated, namely the vertical distance between the turns of the helix.

When planting bulbs, seedlings, perennial starts and other new plants in fields and yards, it is not practical or desirable to carry along a heavy powerful gasoline powered drive motor. If the area in which the plants are to be planted is not close to a continuous electrical power source, the only practical power source is battery powered devices which typically have lower power and torque than conventional gasoline powered drives or wired electrical devices.

Thus, a method and auger for planting bulbs, seedlings, perennial starts and other plants that works well with low power and low torque drive motors in remote areas and that can create holes quickly with little effort by the user is needed and desired

SUMMARY OF THE INVENTIONS

The present inventions comprise unique augers and methods for using them. In a preferred embodiment the auger comprises an auger blade substantially perpendicular to the axis of rotation and extending substantially across the entire diameter of the bored hole. In more presently preferred embodiment, the auger blade is formed at an angle of approximately 145° from the axis of rotation and includes offset wings extending longitudinally away from the auger tip. Both of these embodiments allows the user to easily and completely control the speed at which the auger penetrates the ground while requiring minimal effort to prevent the auger from being pulled into the ground.

It is therefore an object of the present inventions to provide garden auger that generates at most a slight downward pull when operated at high speeds and quickly clears the hole for planting.

DETAILED DESCRIPTION OF THE PREFERRED EMBODIMENTS

Figure 1:
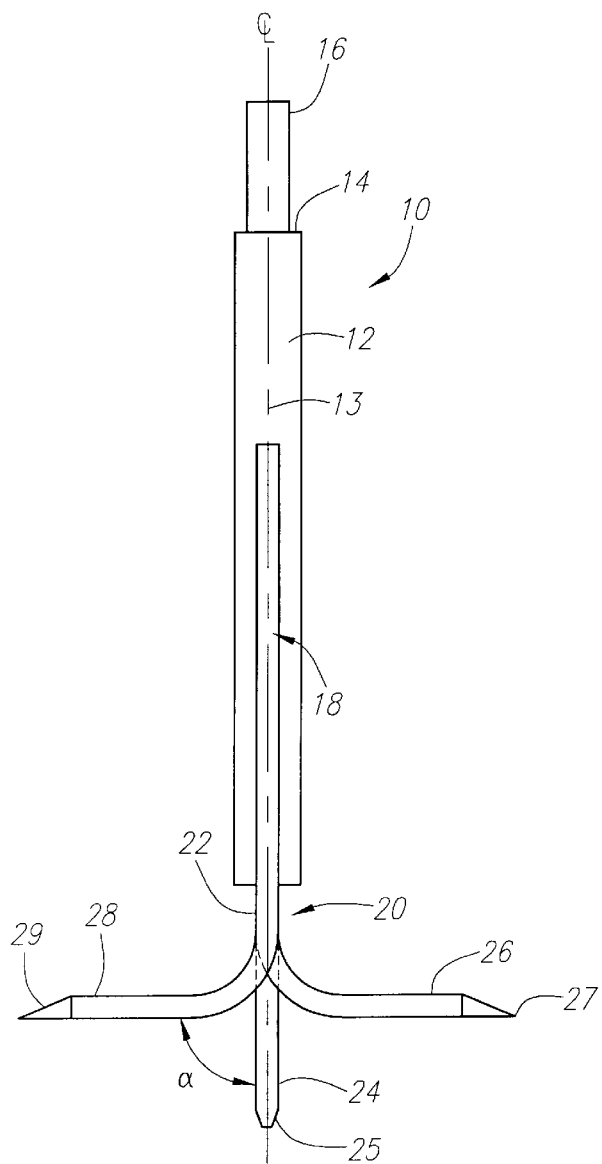
FIG. 1 is a side view of a garden auger in accordance with the present invention.

The garden auger 10 in FIG. 1 comprises a shaft 12. The shaft 12 is preferably ½" in diameter. The preferred method for use of the garden auger 10 of FIG. 1 is with a ⅜" drill motor. As such the shaft 12 includes a step 14 and an attachment portion 16 having a diameter of ⅜". It is to be understood that if the drill motor to be used in conjunction with the garden auger was ½", the attachment portion 16 would be ½" in diameter. Similarly, if the drill motor to be used was a ¼" diameter drill motor the attachment portion 16 would be ¼" in diameter. It is also presently preferred that the attachment portion 16 be hexagonal in cross section to prevent slippage between the drill motor and attachment portion 16 when the ground is exceptionally rocky or binding.

In the garden auger of FIG. 1 the shaft 12 is approximately 7⅛" long, leaving approximately 7" extending from the drill motor in which it will be inserted. This length has proven to be useful, in that when this length garden auger is used the planter need not have to stand to create the plant hole and then bend down to place the plant in the hole. In applications where the plantings are to be made close together by one person, this has proven to be a highly efficient length.

The garden auger 10 of FIG. 1 also includes an auger blade 20. The auger blade 20 may be formed integrally with auger shaft 12. However, for ease in manufacturing the auger blade 20 is attached to the shaft 12 by welding. Additionally, it is presently preferred that shaft 12 includes a slot 18 into which the auger blade 20 is inserted prior to assembly.

Figure 2:
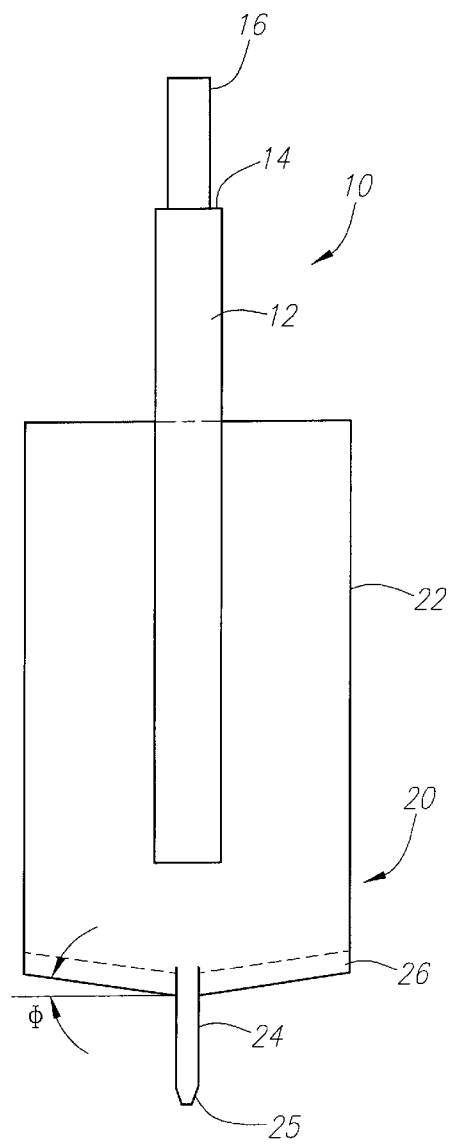
FIG. 2 is a front view of a garden auger in accordance with the present invention.

The auger blade 20 of the garden auger 10 of FIG. 1 and FIG. 2 includes a body 22, a tip 24 and cutters 26 and 28. Preferably these are made from a single piece of material, preferably steel. The body 22 has a width approximately equal to the diameter of the hole that is to be created. The length of the body 22 is approximately equal to the depth of the hole that is to be created. In the preferred embodiment, the body 22 is 2.5" wide and approximately 4" in length. In the preferred embodiment, the body 22 is 1/8" thick.

The tip 24 is aligned with the longitudinal axis 13 of the shaft 12. In the preferred embodiment of FIG. 1, the tip 24 is 3/4" in length and 1/4" in width. Additionally, the tip 24 includes a point 25 which is preferably tapered to a blunt end.

The preferred garden auger 10 of FIG. 1 includes two cutters 26 and 28. They are preferably oriented at an angle $\alpha$, that is substantially perpendicular to the plane of the body 22 and at a slight angle $\phi$, preferably 7½° with respect to a plane approximately perpendicular to the plane of the body 22. Both of the cutters 26 and 28 include bevels 27 and 29, respectively. The presently preferred length of the cutters 26 and 28 is 3/4".

In the preferred embodiment of FIG. 1, the garden auger 10 was constructed from metal, specifically steel. It is contemplated that the entire garden auger 10 could be of a single piece construction and molded using a high strength non-brittle plastic material.

Figure 3:
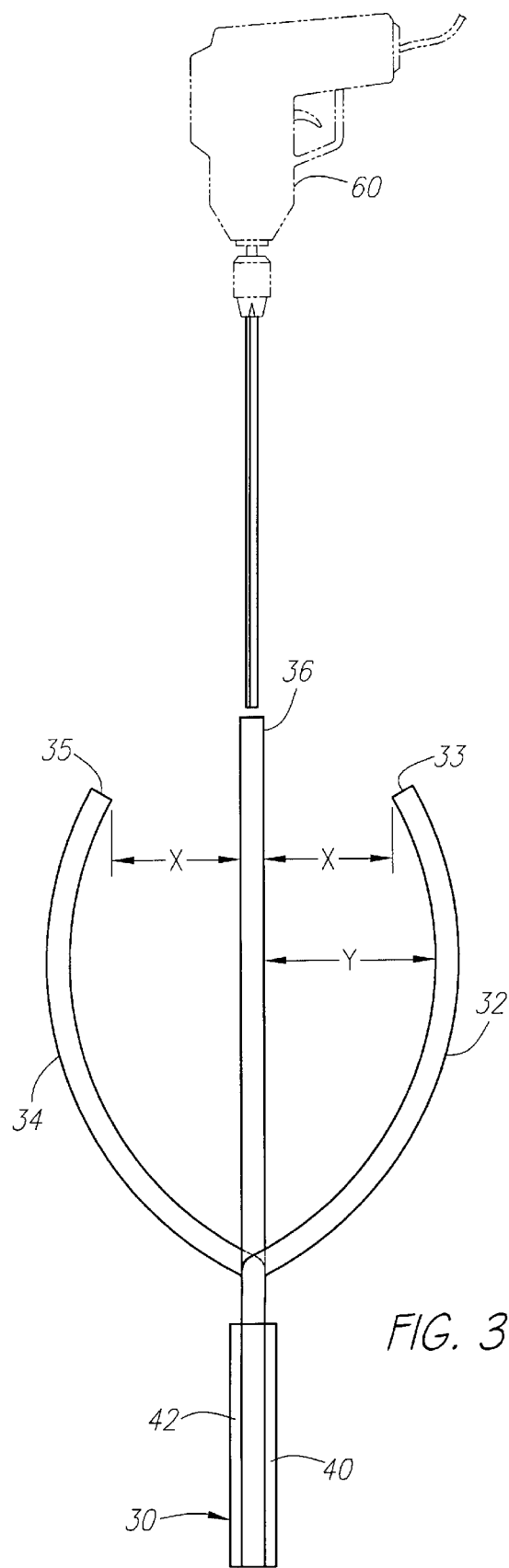
FIG. 3 is a side view of an auger blade of a garden auger in accordance with the present invention.
Figure 4:
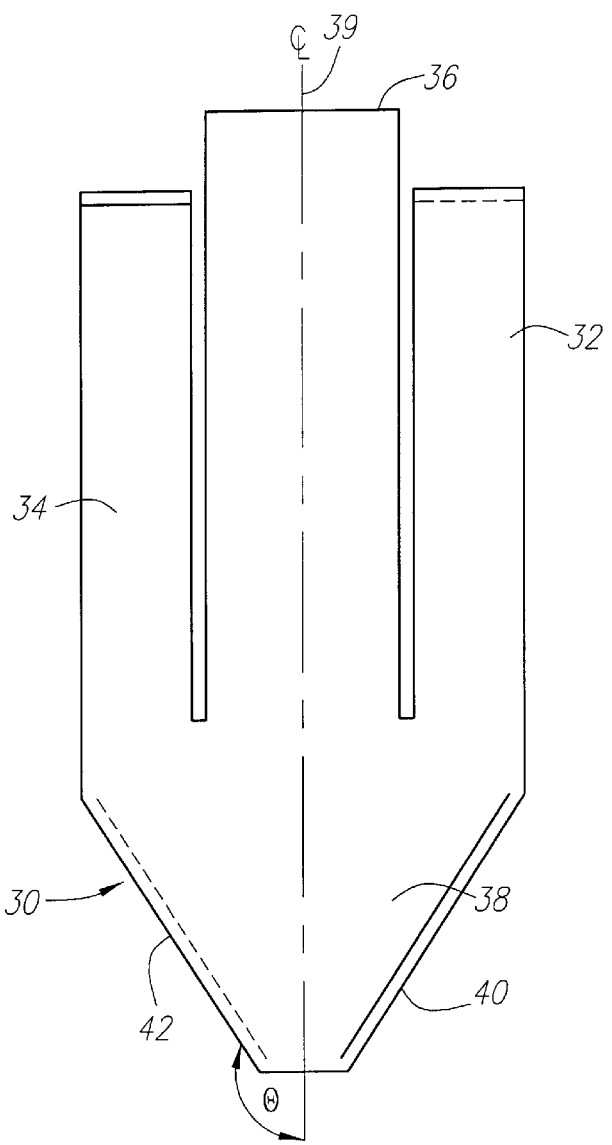
FIG. 4. is a front view of the auger blade of FIG. 3.
Figure 5:
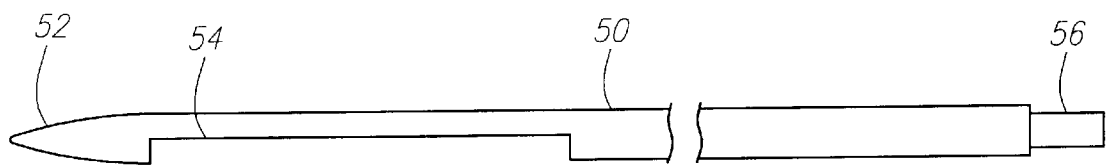
FIG. 5 is a side view of an auger shaft for use with the auger blade of FIG. 3.

FIGS. 3–5 depict components of another embodiment of the garden auger of the present invention. Whereas the garden auger 10 depicted in FIGS. 1 and 2 has proven highly effective in high loam soil, the garden auger having an auger blade as depicted in FIGS. 3 and 4 has proven highly efficient in high clay content soil.

The auger blade 30 depicted in FIG. 3 includes wings 32 and 34 and a central body 36. The wings 32 and 34 extend outwardly from opposite sides of the plane of the central body 36. Each wing 32 and 34 are preferably of an arcuate shape and have a rectangular cross section. The preferred radius of curvature of the wings 32 and 34 is approximately 2". In the preferred embodiment, the free ends 33 and 35 of the wings 32 and 34 are a distance X from the plane of the central body 36 that is less than the maximum distance Y, the farthest distance of any portion of the wings 32 and 34 from the plane of the central body 36 forming toed-in wings.

The auger blade 30 also includes a tip 38, preferably being substantially trapezoidal in configuration, the trapezoidal shape of said tip includes angled sides oriented at an angle greater than 135 degrees from the longitudinal axis of said central body, and cutters 40 and 42. The cutters 40 and 42 preferably have a taper and extend outward from the plane of the tip 38 and central body 36 in opposite directions. Preferably the extension is only about 1/4". The angle $\Theta$ of the axis of the cutters is preferably approximately 142° from the longitudinal axis 39 of the auger blade 30 in a plane parallel with the plane of the tip 38.

The overall width of the auger blade 30 preferably comprises the width of the two wings 32 and 34 and the central body 36 and is preferably substantially equal to the diameter of the hole that is to be created. In the preferred embodiment depicted in FIG. 4, this width is approximately 4½".

The auger blade 30 is preferably secured to a shaft 50 by means of welding. In the preferred shaft 50 depicted in FIG. 5, the shaft includes a point 52 and a channel 54. Preferably the channel 54 is the length of the auger blade 30. The shaft 50 is preferably ½" in diameter and includes an attachment portion 56 that can be fabricated with the same configurations as described with attachment portion 16 of the embodiment in FIGS. 1 and 2.

The shafts 12 and 50 can be made any length. A length of approximately 27" has proven convenient for applications in which the planter does not wish to bend to create the holes for planting.

In practice, an efficient method for planting perennial start, bulbs, seedlings or cuttings in small patches by a single person is to insert the garden auger having a shaft less than one foot in length and a width substantially equal to the diameter of the hole to be created in a drill motor 60; rotating the garden auger at a very high rate of rotation, preferably approximately the highest RPM of conventional 3/8" drill motors 60; kneeling or bending to create the holes for planting by penetrating the ground until the top of the auger blade is below ground level and, while still kneeling or bending, inserting the plants in the created holes and, while still kneeling or bending, finishing the area around the plants.

In practice, an efficient method for planting perennial starts, bulbs, seedlings or cuttings over a wide area is to insert a garden auger having a length of greater than two feet and a width approximately equal to the width of the desired hole in a drill motor 60, rotating the garden auger at a very high rate of rotation, preferably approximately the highest RPM of conventional 3/8" drill motors 60, creating the holes for planting without bending or kneeling by penetrating the ground until the top of the auger blade is below ground level, inserting the bulbs, perennial starts, seedlings or cuttings into the holes and finishing the area around the plants.

While the invention has been described with regard to presently known and preferred embodiments, it is to be understood that the inventions are not to be limited to those embodiments and not restricted except within the scope and spirit of the claims appended hereto.

I claim:

1. A garden auger comprising a shaft and an auger blade; said auger blade comprising a central body and a tip; said central body portion being substantially rectangular and substantially planar; said tip having a first end and a tip free end; said first end of said tip attached to one end of said central body; said tip being substantially planar and in substantially the same plane as said central body;

said auger blade comprising a first wing and a second wing, said first wing attached to said tip at a first wing first end and said second wing attached to said tip at a second wing first end; said first wing extending from said tip at a first angle; said second wing extending from said tip at a second angle;

wherein said first wing includes a first wing free end and said second wing includes a second wing free end; said first and second wing free ends are oriented in a direction generally opposite that of said tip free end;

said auger blade attached to said shaft to prevent rotation therebetween; and said shaft comprising an attachment portion.

2. The garden auger of claim 1 wherein said attachment portion is adapted to be inserted in a drill motor.

3. The garden auger of claim 1 wherein said first and second wings are arcuate in shape.

4. The garden auger of claim 3 wherein said first wing free end and said second wing free end are a distance X from the plane of said central body and a portion of said first and said second wings are a distance Y from the plane central body, where Y is greater than X.

5. The garden auger of claim 3 wherein said arcuate shape of said first wing and said second wing comprise a radius of curvature of approximately 2 inches.

6. The garden auger of claim 5 wherein said shaft further includes a channel in which said auger blade is mounted.

7. The garden auger of claim 1 wherein said shaft further includes a point.

8. The garden auger of claim 1 wherein said shaft is greater than two feet in length.

9. The garden auger of claim 1 wherein said shaft is less than one foot in length.

10. The garden auger of claim 1 wherein said first and second wings are attached to said tip to form toed-in wings.

11. A garden auger comprising a shaft and an auger blade;

said auger blade comprising a central body and a tip; said central body portion being substantially rectangular and substantially planar; said tip attached to one end of said central body and being substantially trapezoidal in configuration;

said auger blade comprising a first wing and a second wing, said first wing attached to said tip at a first wing first end and said second wing attached to said tip at a second wing first end; said first wing extending from said tip at a first angle; said second wing extending from said tip at a second angle;

said auger blade attached to said shaft to prevent rotation therebetween; and said shaft comprising an attachment portion;

wherein said tip comprises a first cutter and a second cutter extending outwardly from the plane of said tip in opposite directions and at an angle substantially perpendicular to the plane of said tip.

12. A garden auger comprising a shaft and an auger blade;

said auger blade comprising a central body and a tip; said central body portion being substantially rectangular and substantially planar; said tip attached to one end of said central body and being substantially trapezoidal in configuration;

said auger blade comprising a first wing and a second wing, said first wing attached to said tip at a first wing first end and said second wing attached to said tip at a second wing first end; said first wing extending from said tip at a first angle; said second wing extending from said tip at a second angle;

said auger blade attached to said shaft to prevent rotation therebetween; and said shaft comprising an attachment portion;

wherein said trapezoidal shape of said tip includes angled sides oriented at an angle greater than 135° from the longitudinal axis of said central body and wherein said tip comprises a first cutter and a second cutter extending outwardly from the plane of said tip in opposite directions and at an angle substantially perpendicular to the plane of said tip along said angled sides of said tip.

* * * * *